Aug. 8, 1939.  J. C. MacILDOWIE  2,168,445
ARTICLE OF MANUFACTURE
Filed March 7, 1936

INVENTOR
John C. MacIldowie.
BY D. N. Halstead.
ATTORNEY

Patented Aug. 8, 1939

2,168,445

UNITED STATES PATENT OFFICE 2,168,445

ARTICLE OF MANUFACTURE

John C. MacIldowie, Nashua, N. H., assignor to Johns-Manville Corporation, New York, N. Y., a corporation of New York Application March 7, 1936, Serial No. 67,583

6 Claims. (Cl. 35—68)

This invention relates to an article of manufacture, particularly to a blackboard or blackboard base.

Because of the difficulty and expense in providing blackboards having a base of slate of the necessary area and uniformity of thickness, there have been many attempts to prepare a composition base and apply thereto a facing providing the writing surface.

The present invention comprises the novel features of the product, particularly a blackboard including an asbestos-cement base, a facing layer provided over its exterior with a writing surface and adhered or otherwise secured at its back to the base, and a sealing agent preventing migration of water, lime, or other material from the base to the facing layer. In a preferred embodiment the base is somewhat flexible and is waterproofed.

The invention is illustrated in the attached drawing and will be described for the purpose of exemplification in connection therewith.

Figure 1:
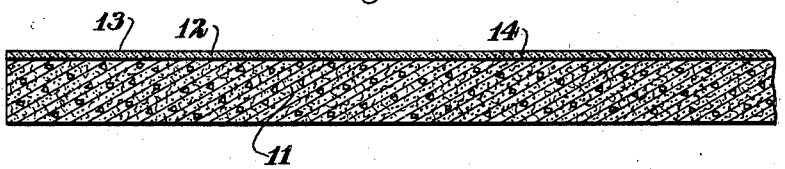
Fig. 1 is a cross sectional view of my improved blackboard.

There are shown in Fig. 1 a base 11, a facing layer 12 provided with an exterior writing surface 13, and means, such as an adhesive layer 14, securing the facing to the base.

Figure 2:
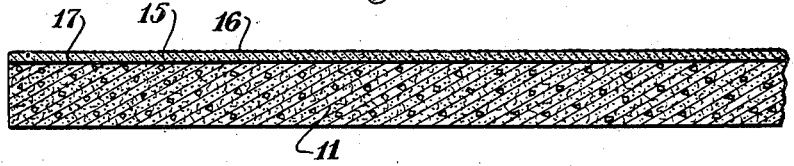
Fig. 2 is a cross sectional view of a modified form of the blackboard.

In Fig. 2 there are shown the base 11, a layer 15 of facing material that is suitably glass and that is ground over its exterior 16 to provide a writing surface, that is, a surface adapted to abrade a crayon moved in frictional contact therewith, and a layer 17 of adhesive securing the glass to the base. If desired, the glass may be substantially colorless. In that case, the adhesive 17 may be dark colored, say, black or green, to give a suitable contrast with the color of the crayon marks.

The base material includes a compressed and hardened intimate mixture of asbestos fibres and a hydraulic cement, suitably intimately associated with a limited proportion of finely divided filler, such as a cellulosic filler of which wood flour or fine sawdust are examples. The cement used is preferably Portland cement although there may be used, for some purposes, a calcium aluminate (cement fondu). The cement, after setting, contains an appreciably water-soluble and migratory ingredient. Thus, hydrated Portland cement contains a substantial amount of lime.

In making such a base sheet there may be formed an intimate mixture of asbestos fibres, the hydraulic cement, sawdust of grade about 50 to 60 mesh or finer, and an excess of water. The resulting mixture is then shaped into sheet form in a filtering mold and strongly compressed, say at about 1,400 to 2,000 pounds to the square inch. This strong compression densifies and consolidates the material and removes some of the excess of water by filtration. The resulting sheet is allowed to set, so that the cement therein is cured to a large extent at least. Thus a period of setting of about fifteen days to a month has been used satisfactorily.

The set material is then dried at a moderately elevated temperature, without dehydration of the hydrated cement therein, and is smoothed over one face, as for instance, with a sanding belt.

Suitable proportions of ingredients in the sheet so made are about equal weights of asbestos fibres and Portland cement and 5 parts by weight of the sawdust filler to 95 parts combined weight of fibres and cement.

To provide moderate flexibility of the finished sheet the proportion of filler and fibres jointly should be about equal to or slightly greater than the weight of cement used. However, proportions of asbestos in cement that are usual in asbestos-cement boards may be used.

The fibres used are advantageously asbestos fibres of average length, as for instance, chrysotile fibres of the grade commonly used in the manufacture of asbestos-cement boards or shingles.

The sheet, after being smoothed, as described, is then impregnated with an agent adapted to prevent migration of ingredients from the sheet to the facing layer in the finished blackboard.

For this impregnation I have used to advantage a limited proportion of a drying oil, as for example, 6 to 10 parts by weight of linseed oil, including a conventional dryer therefor, to 100 parts of the sanded sheet. In making the impregnation, I may immerse the dried and sanded sheet for a short time in the linseed oil and remove the sheet when the amount of oil absorbed corresponds to 6 to 10 parts by weight to 100 parts of the sanded sheet.

While linseed oil is preferred because of its low cost and convenience in application, other waterproofing agents may be used, as, for instance, China-wood or perilla oil, a varnish base, or a resin, such, for instance, as a polymerized vinyl derivative or a plasticized resinous phenolaldehyde condensation product.

When the impregnating (waterproofing) material used is heat-hardenable, a number of the impregnated sheets are baked, advantageously, simultaneously, in one assembly. Thus, the sheets impregnated with linseed oil are heated to a temperature of about 300° F. to 350° F., or other temperature near to but just below the point of objectionable decomposition of the cellulosic filler and below the temperature of substantial dehydration of the hydrated cement present in the sheets.

During this baking operation, the sheets are preferably spaced from each other, say by a distance of half an inch or so, to permit access of air to the impregnated material, if it be one that requires air for hardening, and to permit dissipation of heat from the filler when the filler is one that gives out heat and would be carbonized to an objectionable degree if the heat of incipient carbonization were not thus removed. The product may be lightly sanded over its face subsequent to the baking operation.

The sheet is then ready for the application thereto of the facing layer that provides the writing surface.

The sheet may be heavily coated, say, to a depth of one-sixteenth of an inch or so, with a blackboard finishing material containing a medium and an abrasive to abrade crayon drawn over the finished writing surface in frictional contact therewith.

For example, the facing layer 12 may contain a mixture of Chinawood-oil, a varnish resin, black pigment, of which lamp black is an example, and an abrasive solid mixture such as one containing slate flour and 400-mesh carborundum.

After the facing layer has been made smooth, as by being trowelled on, it is then hardened. For this hardening, the composition may be subjected to an elevated temperature.

The means securing the facing layer to the base in the example given may be the inner portion of the facing layer itself, which portion becomes integral with or footed into the impregnating agent, such as the oil described. Or, a special adhesive layer may be used. This adhesive layer 14, if used, may include a large proportion of one of the resinous materials mentioned above.

The resulting blackboard is very slightly flexible without breakage, so that it may be fitted over a wall of a schoolroom that is not entirely regular and nailed down at the edges of the blackboard, without extensive strain being thus placed upon the board.

The impregnating agent in the finished board prevents migration of moisture absorbed from the atmosphere, lime, or other water-soluble and, hence, migratory ingredient from the base into the facing layer. In other words, the impregnating agent is impenetrable to water-soluble material in the base. There is thus prevented blistering behind the facing layer as well as blooming or efflorescence over the writing surface.

In the modification shown in Fig. 2 the facing layer is a glass sheet that is ground on its exterior face, to provide the writing surface in the finished article.

This glass is adhered to the base, as by means of a slightly yieldable adhesive 17, such as one of the aforesaid resinous materials.

The base 11 shown in Fig. 2 and its method of manufacture may be the same as described above in connection with the article illustrated in Fig. 1.

The adhesive 17 may be colored dark, as desired, as by the introduction of a black or green pigment. Also, if desired, the coloring layer may be applied separately from the adhesive. Thus a black, green, or brown stain or pigment may be applied to the face of the base 11 before the adhesive is applied thereover.

The details given are for the purpose of illustration, not for restriction. It is intended, therefore, that variations within the spirit of the invention are to be included in the scope of the appended claims.

What I claim is:

1. A blackboard comprising a base including a strongly compressed and hardened intimate mixture of asbestos fibres and a hydraulic cement, an adhered facing layer provided over its exterior with a writing surface, and an agent preventing migration of ingredients from the base to the facing, the said agent being impenetrable to water-soluble material of the base.

2. A blackboard as described in claim 1, the said base including a compressed and hardened intimate mixture of asbestos fibres, a finely divided filler, and Portland cement.

3. A blackboard as described in claim 1, the agent for preventing the said migration including a waterproofing compound impregnated into the portion of the base adjacent to the back of the said facing.

4. A blackboard as described in claim 1, the agent for preventing the said migration including a hardened drying oil impregnated into the portion of the base adjacent to the back of the said facing.

5. A somewhat flexible blackboard base comprising a compressed and hardened sheet including an intimate mixture of asbestos fibres, Portland cement, finely divided filler and waterproofing material impregnated into the said sheet.

6. An article of manufacture comprising a sheet including a hardened intimate mixture of asbestos fibres and cement, a facing layer therefor consisting of glass provided with a ground exterior surface, means securing the glass to the said sheet, and an agent preventing migration of ingredients from the sheet to the facing, the said agent being impenetrable to water-soluble material of the sheet.

JOHN C. MacILDOWIE.